United States Patent
Lin et al.

(10) Patent No.: US 10,845,571 B2
(45) Date of Patent: Nov. 24, 2020

(54) OPTICAL LENS

(71) Applicant: Rays Optics Inc., Hukou Township, Hsinchu County (TW)

(72) Inventors: Ying-Hsiu Lin, Hukou Township, Hsinchu County (TW); Ching-Sheng Chang, Hukou Township, Hsinchu County (TW); Chen-Cheng Lee, Hukou Township, Hsinchu County (TW); Kuo-Chuan Wang, Hukou Township, Hsinchu County (TW)

(73) Assignee: RAYS OPTICS INC., Hsinchu (TW)

( * ) Notice: Subject to any disclaimer, the term of this patent is extended or adjusted under 35 U.S.C. 154(b) by 231 days.

(21) Appl. No.: 16/009,651

(22) Filed: Jun. 15, 2018

(65) Prior Publication Data

US 2019/0278055 A1 Sep. 12, 2019

(30) Foreign Application Priority Data

Mar. 9, 2018 (TW) .............................. 107108010 A

(51) Int. Cl.
| | |
|---|---|
| *G02B 13/18* | (2006.01) |
| *G02B 9/62* | (2006.01) |
| *G02B 9/64* | (2006.01) |
| G02B 13/06 | (2006.01) |
| G02B 13/00 | (2006.01) |
| G02B 13/04 | (2006.01) |
| G02B 5/00 | (2006.01) |
| G02B 27/00 | (2006.01) |

(52) U.S. Cl.
CPC ................. *G02B 9/62* (2013.01); *G02B 9/64* (2013.01); *G02B 13/18* (2013.01); *G02B 5/005* (2013.01); *G02B 13/002* (2013.01); *G02B 13/0045* (2013.01); *G02B 13/04* (2013.01); *G02B 13/06* (2013.01); *G02B 27/0025* (2013.01)

(58) Field of Classification Search
CPC ............ G02B 13/0045; G02B 27/0025; G02B 5/005; G02B 13/06; G02B 13/04; G02B 13/002; G02B 9/62; G02B 9/64; G02B 13/18
USPC ....... 359/708, 713, 725, 739, 740, 750–752, 359/755, 770
See application file for complete search history.

(56) References Cited

U.S. PATENT DOCUMENTS

| | | |
|---|---|---|
| 5,760,973 A | 6/1998 | Kawamura |
| 7,023,628 B1 * | 4/2006 | Ning ..................... G02B 13/06 359/680 |
| 7,869,141 B2 * | 1/2011 | Ning ..................... G02B 13/06 359/753 |
| 8,254,040 B2 | 8/2012 | Peng |
| | (Continued) | |

*Primary Examiner* — Evelyn A Lester
(74) *Attorney, Agent, or Firm* — Muncy, Geissler, Olds & Lowe, P.C.

(57) ABSTRACT

An optical lens includes a first lens group and a second lens group arranged in order from a first side to a second side, and an aperture stop disposed between the first lens group and the second lens group. The optical lens satisfies the condition of LT/IMH<4.7, where IMH is semi-diagonal image height on an image plane, and LT is a distance along an optical axis between a surface of a first lens of the first lens group facing the first side and a surface of a last lens of the second lens group facing the second side. The first lens is closest to the first side among the first lens group, and the last lens is closest to the second side among the second lens group.

20 Claims, 15 Drawing Sheets

(56) References Cited

U.S. PATENT DOCUMENTS

| | | | |
|---|---|---|---|
| 9,261,670 B2 | 2/2016 | Lai | |
| 10,746,967 B2 * | 8/2020 | Hudyma | ................ G02B 5/208 |
| 2013/0063829 A1 * | 3/2013 | Kang | ....................... G02B 9/04 |
| | | | 359/753 |
| 2013/0114150 A1 * | 5/2013 | Kwon | ................ G02B 13/0045 |
| | | | 359/713 |

* cited by examiner

_US 10,845,571 B2_

OPTICAL LENS

BACKGROUND OF THE INVENTION a. Field of the Invention

The invention relates to an optical lens.

b. Description of the Related Art

Recent advances in technology have led to the development of various types of optical lenses. A wide angle lens is a commonly used optical imaging device. Nowadays, there is a growing need for an optical lens to become thinner and have high optical performance. To meet these requirements, the optical lens needs to have low fabrication costs, large effective aperture, wide viewing angles and light weight. Therefore, it is desirable to provide an optical lens that may achieve lighter weight, lower fabrication costs and good imaging quality.

BRIEF SUMMARY OF THE INVENTION

According to one aspect of the present disclosure, an optical lens includes a first lens group and a second lens group arranged in order from a first side to a second side, and an aperture stop disposed between the first lens group and the second lens group. The optical lens has at least six lenses and at most nine lenses with refractive powers, a full field of view of 160 degrees to 180 degrees, and an entrance pupil diameter of greater than 2 mm. The optical lens satisfies the condition of LT/IMH<4.7, where IMH is semi-diagonal image height on an image plane that equals half of an image circle, and LT is a distance along an optical axis between a surface of a first lens of the first lens group facing the first side and a surface of a last lens of the second lens group facing the second side. The first lens is closest to the first side among the first lens group, and the last lens is closest to the second side among the second lens group.

According to another aspect of the present disclosure, an optical lens includes a first lens group, an aperture stop and a second lens group arranged in order from a magnified side to a minified side. The first lens group has a negative refractive power, and the second lens group has a positive refractive power. The optical lens has at least six lenses and at most nine lenses with refractive powers, and the optical lens satisfies the conditions of 1.9<LD1/LD3<2.6 and LD1/LDL<1.55, where LD1 is a diameter of a surface of a first lens of the first lens group facing the magnified side, LD3 is a diameter of a surface of another lens of the first lens group facing the minified side, LDL is a diameter of a surface of a last lens of the second lens group facing the minified side, the first lens is closest to the magnified side among the first lens group, the another lens is closest to the aperture stop among the first lens group, and the last lens is closest to the minified side among the second lens group.

According to the above embodiments, an optical lens having lighter weight, lower fabrication costs and good imaging quality is provided.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. Further, "First," "Second," etc, as used herein, are used as labels for nouns that they precede, and do not imply any type of ordering (e.g., spatial, temporal, logical, etc.).

The term "optical element" refers to an element made from at least in part a material that may refract, reflect, diffract, diffuse or filter at least a portion of the light passing through it. The material may include plastic or glass, and the optical element may be, for example, a lens, a prism or an aperture stop.

In an image-pickup system, a magnified side may refer to one side of an optical path of an optical lens comparatively near a subject to be picked-up, and a minified side may refer to other side of the optical path comparatively near a photosensor.

A certain region of a magnified side surface (or a minified side surface) of a lens may be convex or concave. Herein, a convex or concave region is more outwardly convex or inwardly concave in the direction of an optical axis as compared with other neighboring regions of the magnified/minified side surface.

Figure 1:
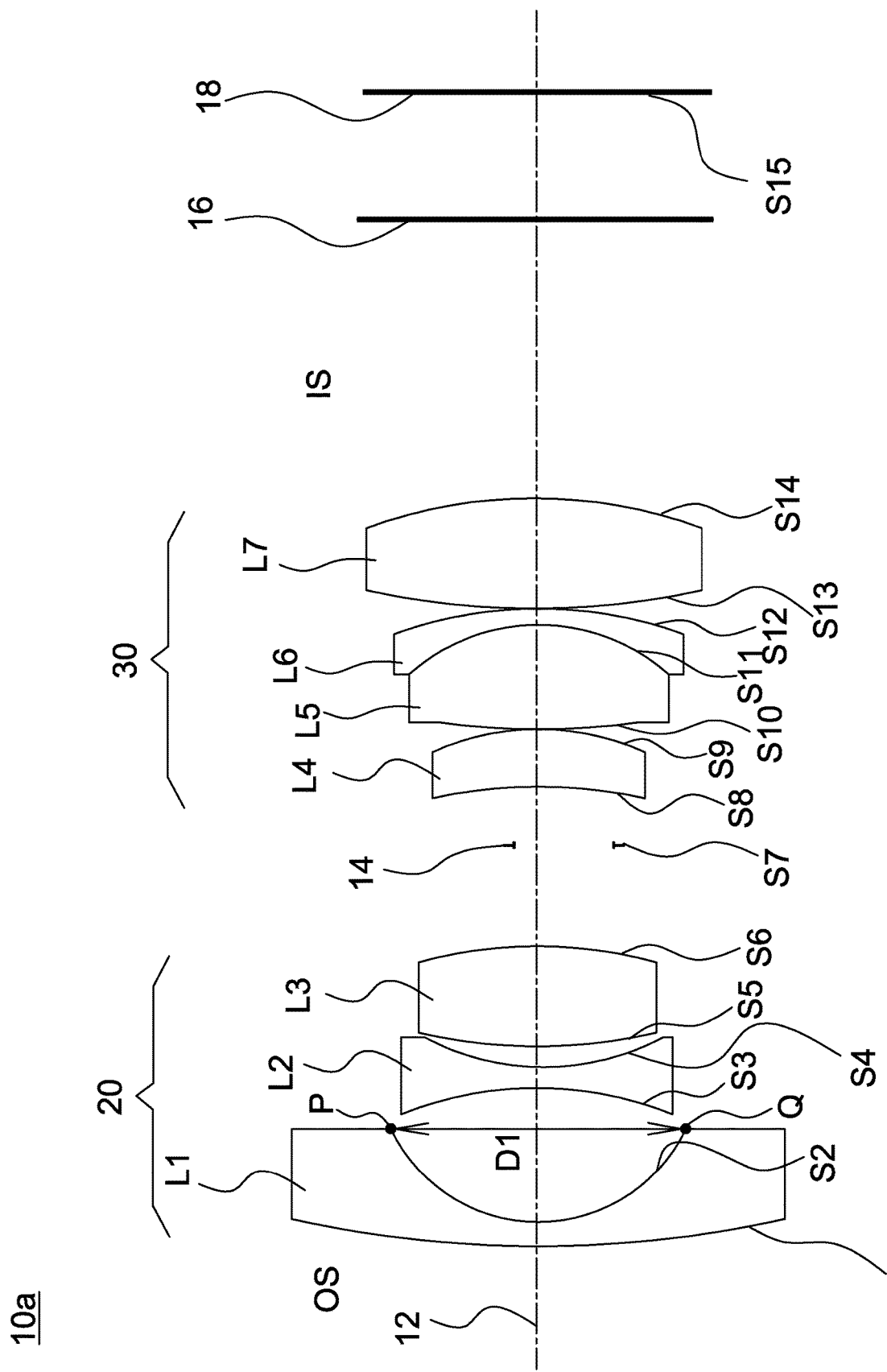
FIG. 1 shows a cross-sectional illustration of an optical lens according to an embodiment of the invention.

FIG. 1 shows a cross-sectional illustration of an optical lens according to an embodiment of the invention. As shown in FIG. 1, in this embodiment, the optical lens 10a has a lens barrel (not shown), and inside the lens barrel a first lens L1, a second lens L2, a third lens L3, an aperture stop 14, a fourth lens L4, a fifth lens L5, a sixth lens L6 and a seventh lens L7 are arranged in order from a first side (magnified side OS) to a second side (minified side IS). The first lens L1, the second lens L2, the third lens L3 and the fourth lens L4 form a first lens group 20 (such as a front lens group) with a negative refractive power, and the fifth lens L5, the sixth lens L6 and the seventh lens L7 form a second lens group 30 (such as a rear lens group) with a positive refractive power. Further, the minified side IS may be disposed with a cover glass 16 and a photosensor (not shown). An image plane of the optical lens 10a formed at an effective focal length for visible light is labeled as 18, and the cover glass 16 is disposed between the second lens group 30 and the image plane 18 for visible light. In this embodiment, the refractive powers of the first lens L1 to the seventh lens L7 are negative, negative, positive, positive, positive, negative and positive, and all of the lenses L1-L7 are spherical lenses. In one embodiment, adjoining surfaces of each two adjacent lenses may have an identical or a similar radius of curvature and are fit together to form a doublet lens or a triplet lens. For example, in this embodiment, the fifth lens L5 and the sixth lens L6 are fit together to form a doublet lens, but the invention is not limited thereto. In each of the following embodiments, the magnified side OS is located on the left side and the minified side IS is located on the right side of each figure, and thus this is not repeatedly described in the following for brevity.

The aperture stop 14 may be an independent component or integrally formed with other optical element. In this embodiment, the aperture stop may use a mechanic piece to block out peripheral light and transmit central light to achieve aperture effects. The mechanic piece may be adjusted by varying its position, shape or transmittance. In other embodiment, the aperture stop may be formed by applying an opaque or a light-absorbing material on a lens surface except for a central area to block out peripheral light and transmits central light.

A surface of a lens may be assigned a parameter of "diameter". For example, as shown in FIG. 1, a diameter D1 of a surface S2 of the lens L1 facing the minified side IS is a distance between two opposite turning points P and Q measured in a direction perpendicular to the optical axis 12. In this embodiment, a diameter of a surface S1 is 6.16 mm, a diameter of a surface S6 is 2.94 mm, and a diameter of a surface S14 is 4.2 mm.

Detailed optical data and design parameters of the optical lens 10a are shown in Table 1 below. Note the data provided below are not used for limiting the invention, and those skilled in the art may suitably modify parameters or settings of the following embodiment with reference of the invention without departing from the scope or spirit of the invention.

TABLE 1

F/# = 1.8; LT = 25.7 (mm)
FOV = 160 degrees; LT/IMH = 4.214

| surface | radius of curvature (mm) | interval (mm) | refractive index | Abbe number | object description |
| --- | --- | --- | --- | --- | --- |
| S1 | 27.77 | 0.7 | 1.6 | 36 | L1(meniscus) |
| S2 | 4.07 | 3.3 | | | |
| S3 | −8.70 | 0.5 | 1.5 | 52 | L2(biconcave) |
| S4 | 5.99 | 0.6 | | | |
| S5 | 11.24 | 2.3 | 2 | 29 | L3(biconvex) |
| S6 | −14.01 | 2.3 | | | |
| S7 | INF | 1.6 | | | aperture stop |
| S8 | −25.71 | 1.6 | 1.5 | 81 | L4(meniscus) |
| S9 | −6.54 | 0.1 | | | |
| S10 | 32.30 | 2.4 | 1.5 | 81 | L5(biconvex) |
| S11 | −5.03 | 0.5 | 2 | 19 | L6(meniscus) |
| S12 | −9.78 | 0.1 | | | |
| S13 | 25.92 | 2.6 | 1.7 | 48 | L7(biconvex) |
| S14 | −15.53 | 7.0 | | | |
| S15 | INF | | | | image plane |

In the above Table 1, the field heading "interval" represents a distance between two adjacent surfaces along the optical axis 12 of the optical lens 10a. For example, an interval of the surface S1 is a distance between the surface S1 and the surface S2 along the optical axis 12. Further, the interval, refractive index and Abbe number of any lens listed in the column of "Object description" show values in a horizontal row aligned with the position of that lens. Moreover, in table 1, the surfaces S1 and S2 are two lens surfaces of the first lens L1, the surfaces S3 and S4 are two lens surfaces of the second lens L2, and the remaining lens surfaces are classified by analogy so that related descriptions are omitted for sake of brevity. The aperture stop 14 is designated by the surface S7, and the image plane 18 of the optical lens 10a is designated by the surface S15.

In the above table, the surface denoted by an asterisk is an aspheric surface, and a surface without the denotation of an asterisk is a spherical surface.

The radius of curvature is a reciprocal of the curvature. When the curvature is positive, the center of a lens surface is located towards the minified side. When the curvature is negative, the center of a lens surface is located towards the magnified side. The concavity and convexity of each lens surface is listed in the above table and shown in corresponding figures.

The Symbol F/# shown in the above table is an aperture value of the aperture stop. When the optical lens is used in an optical projection system, the image plane is provided on a light valve, and, when the optical lens is used in an image pick-up system, the image plane is a sensing surface of a photosensor.

When the optical lens is used in an image pick-up system, an image circle refers to a diagonal length of an image on an image plane, and a semi-diagonal image height IMH shown in the above table equals half of the image circle.

A total lens length of the optical lens 10a is denoted as "LT" in the above table. Specifically, the total lens length LT is a distance along the optical axis 12 between an optical surface S1 closest to the magnified side and an optical surface S14 closest to the minified side, as shown in the above table.

In this embodiment, FOV denoted in the above table is a light collection angle of the optical surface S1 closest to the magnified side; that is, the FOV is a full field of view measured diagonally.

Figure 6:
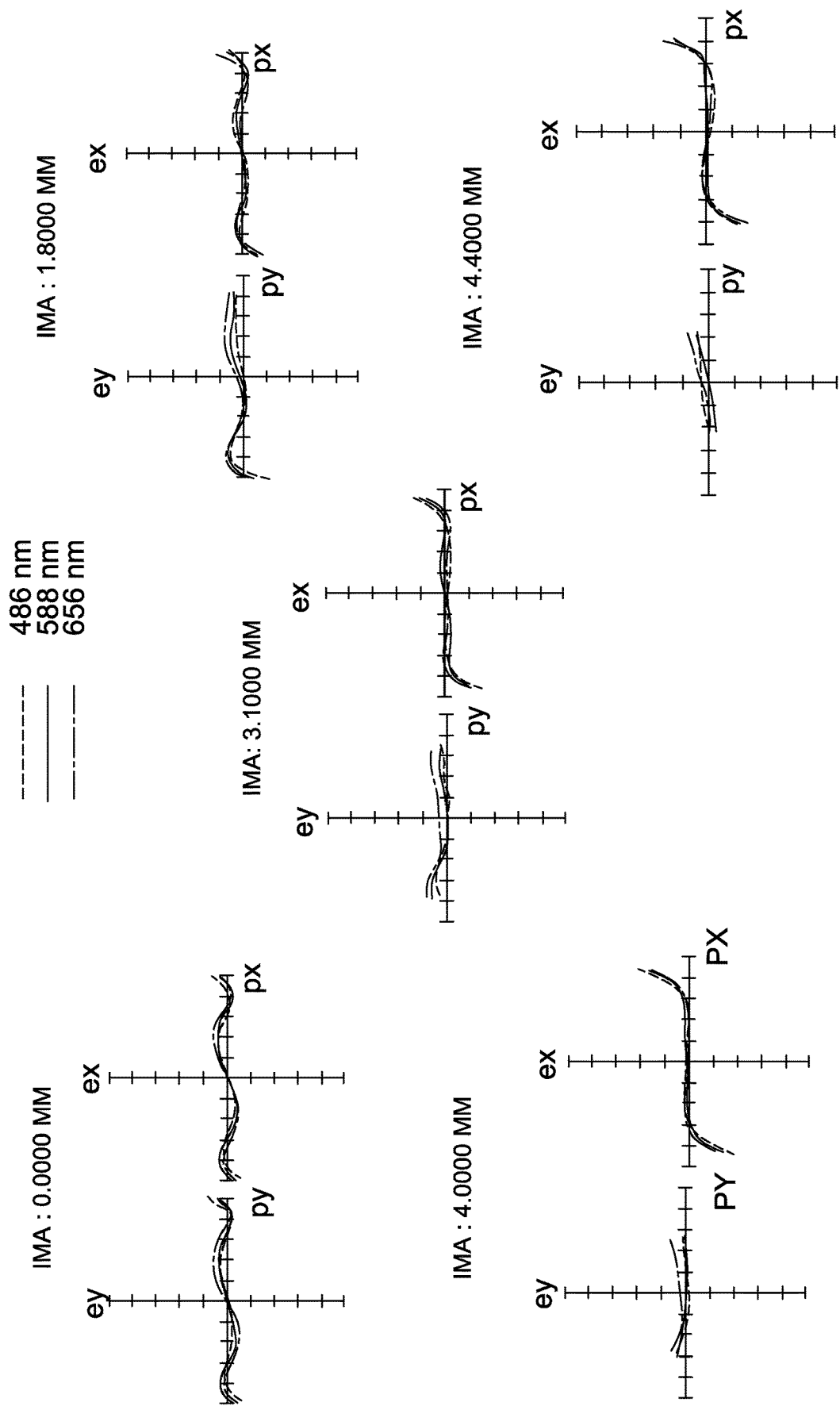
FIGS. 6-10 are ray fan plots for visible light respectively for the optical lenses shown in FIGS. 1-5.
Figure 7:
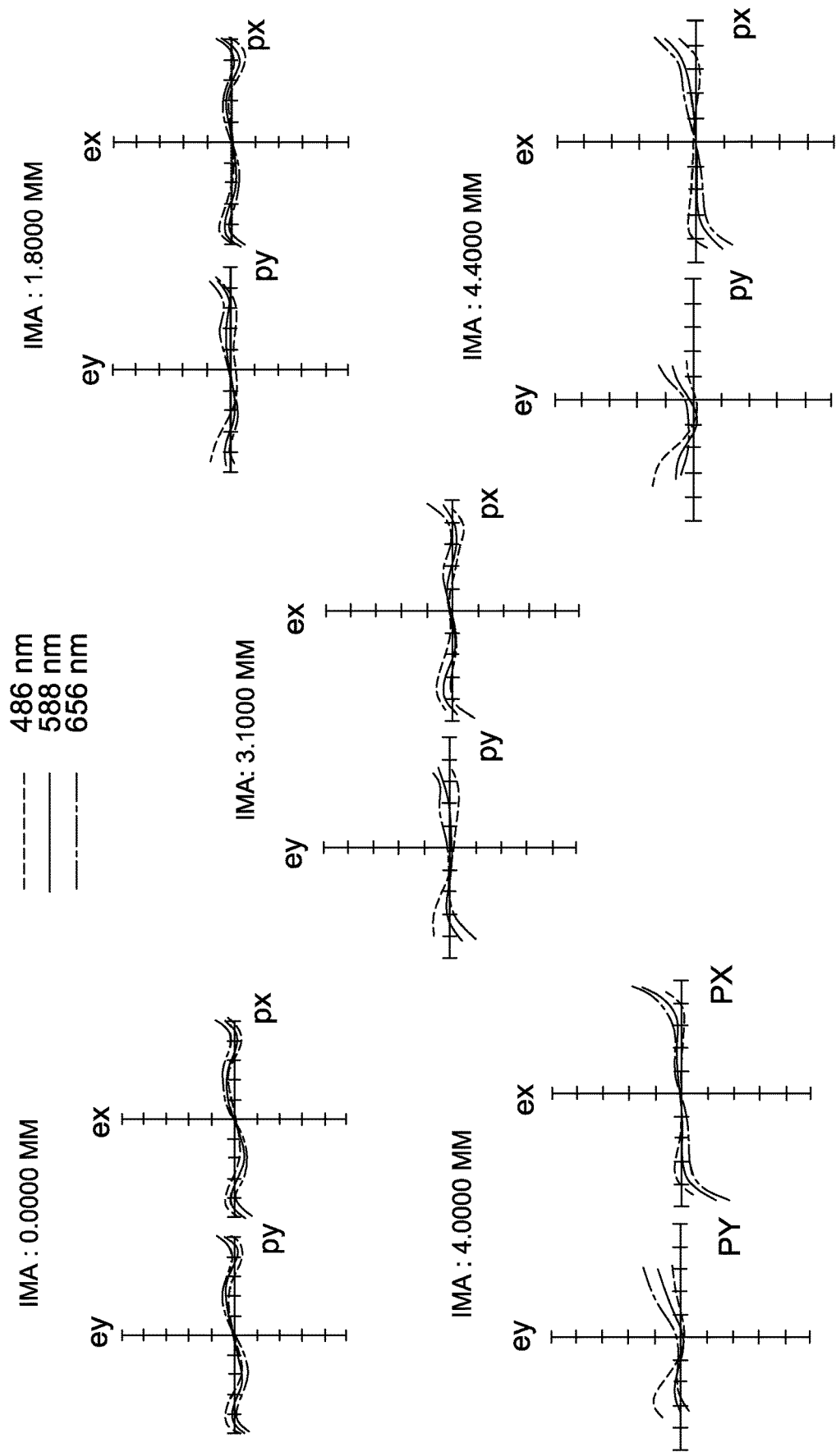
Figure 8:
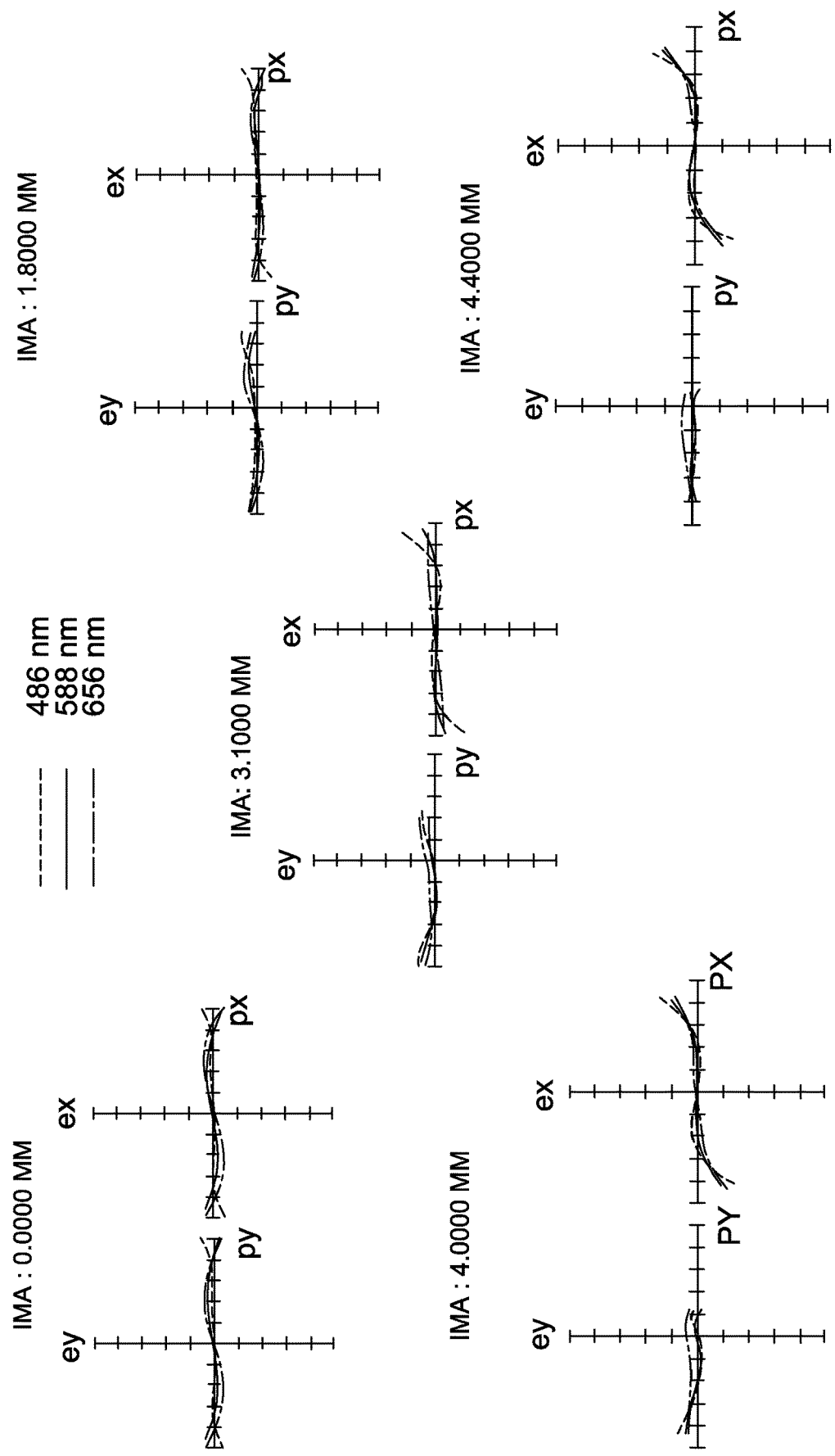
Figure 9:
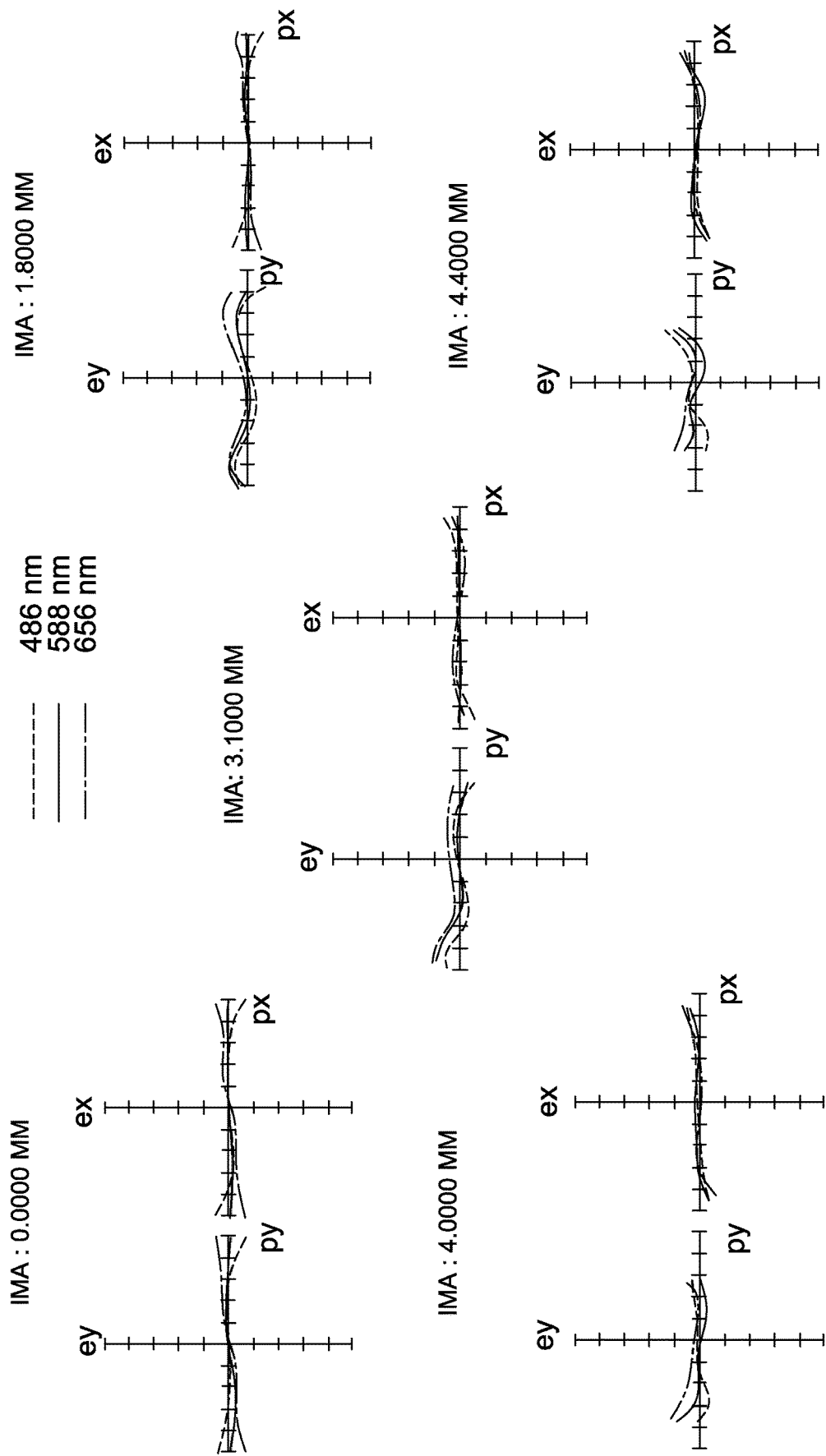
Figure 10:
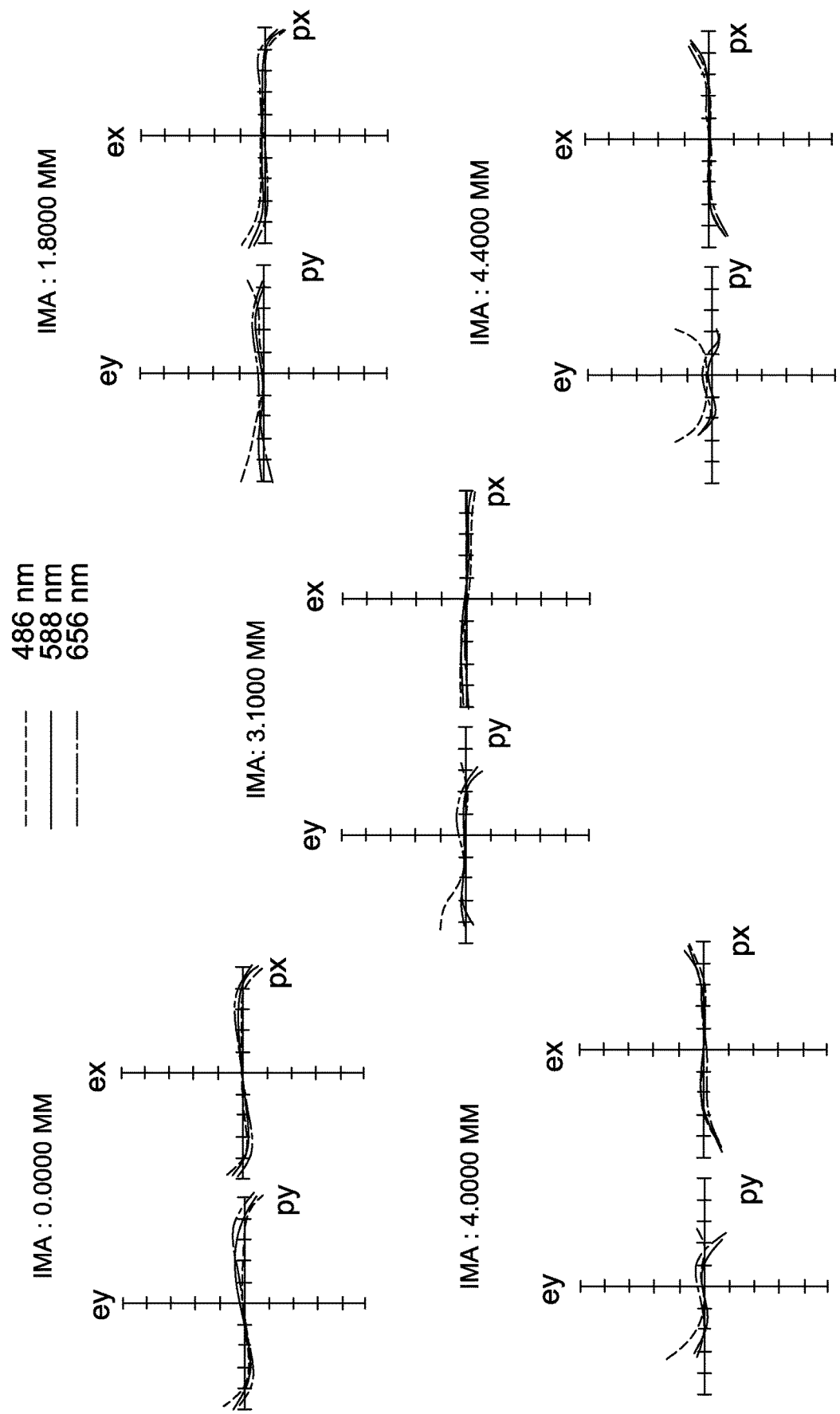
Figure 11:
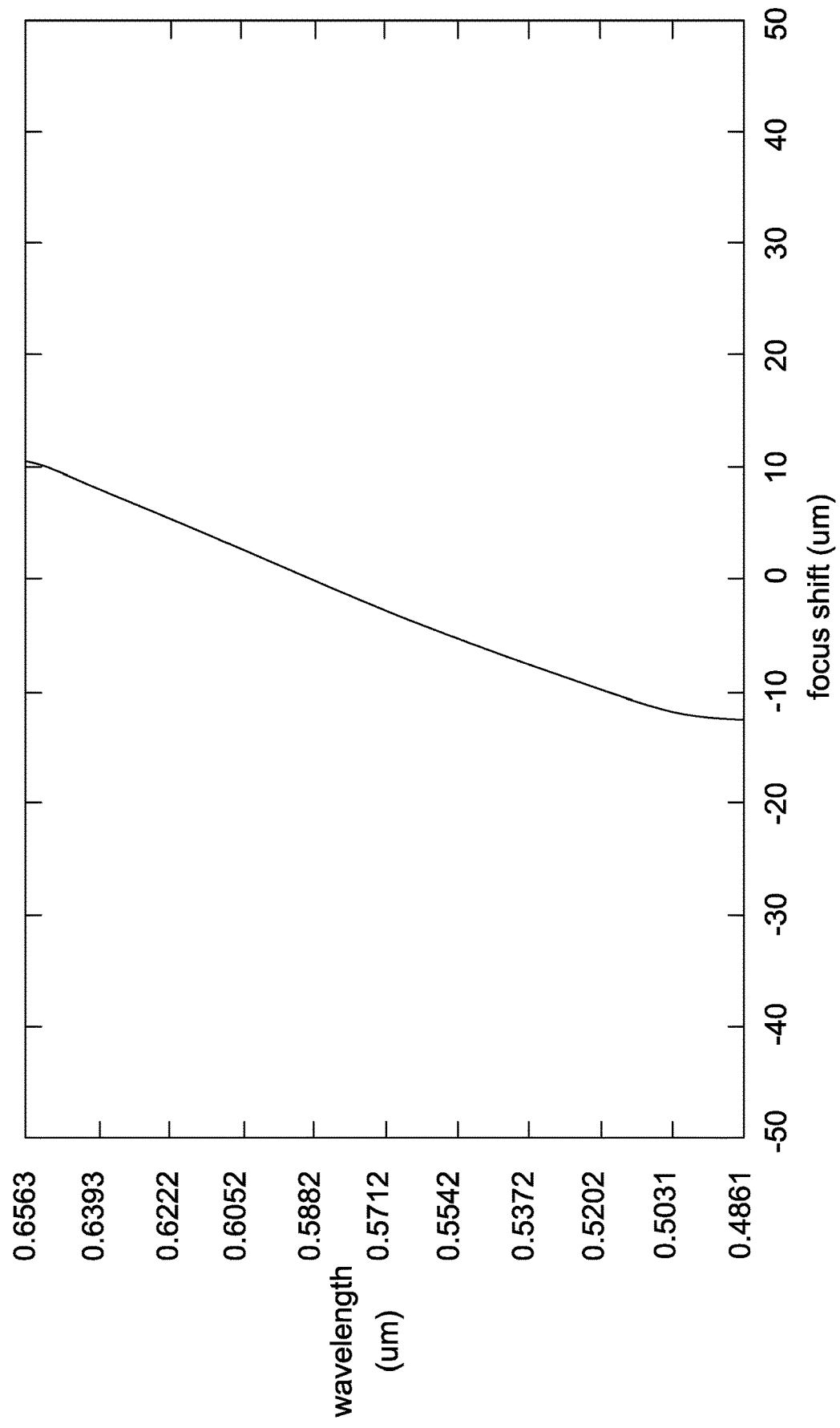
FIGS. 11-15 are focus shift plots respectively for the optical lenses shown in FIGS. 1-5.
Figure 12:
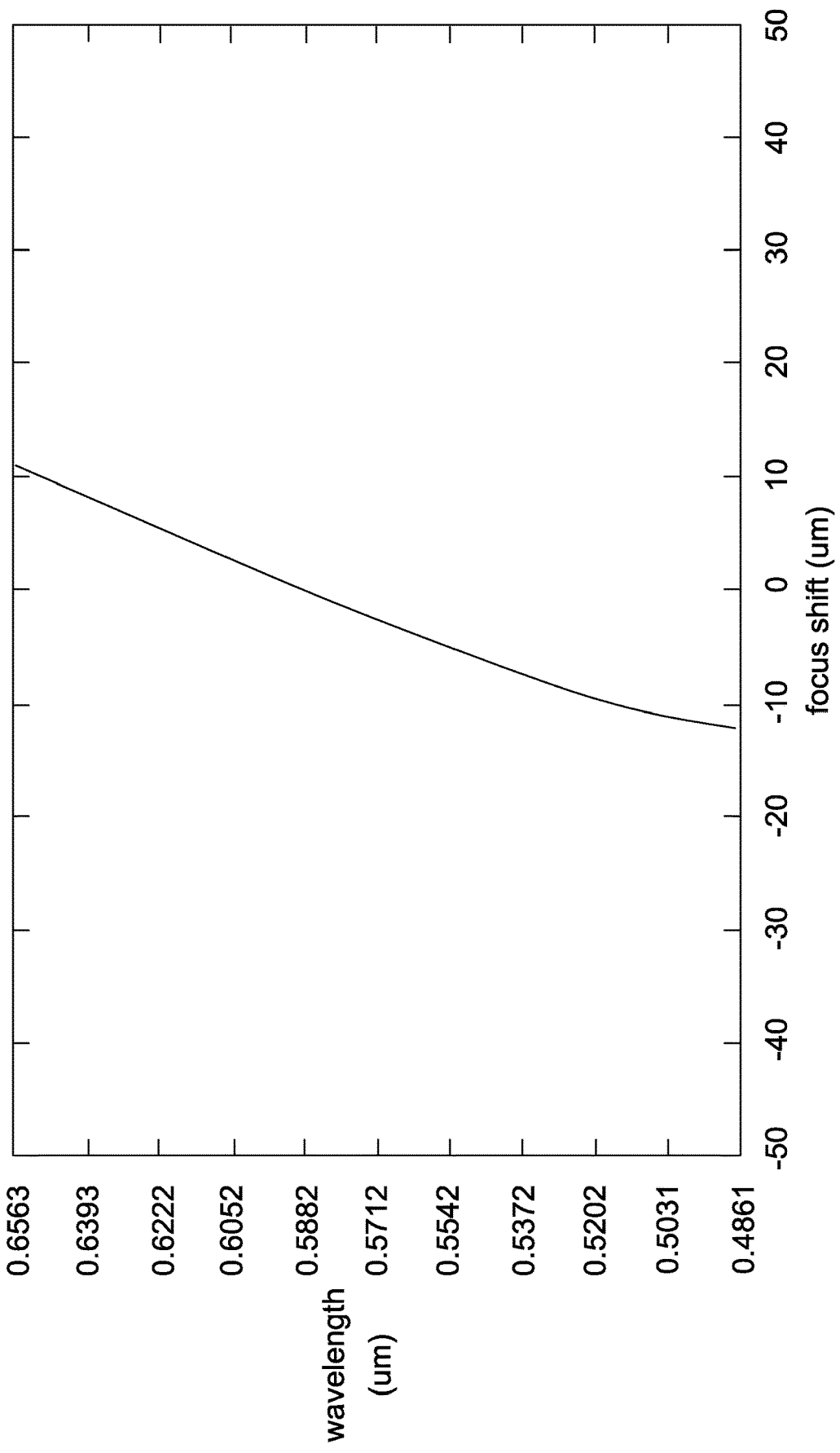
Figure 13:
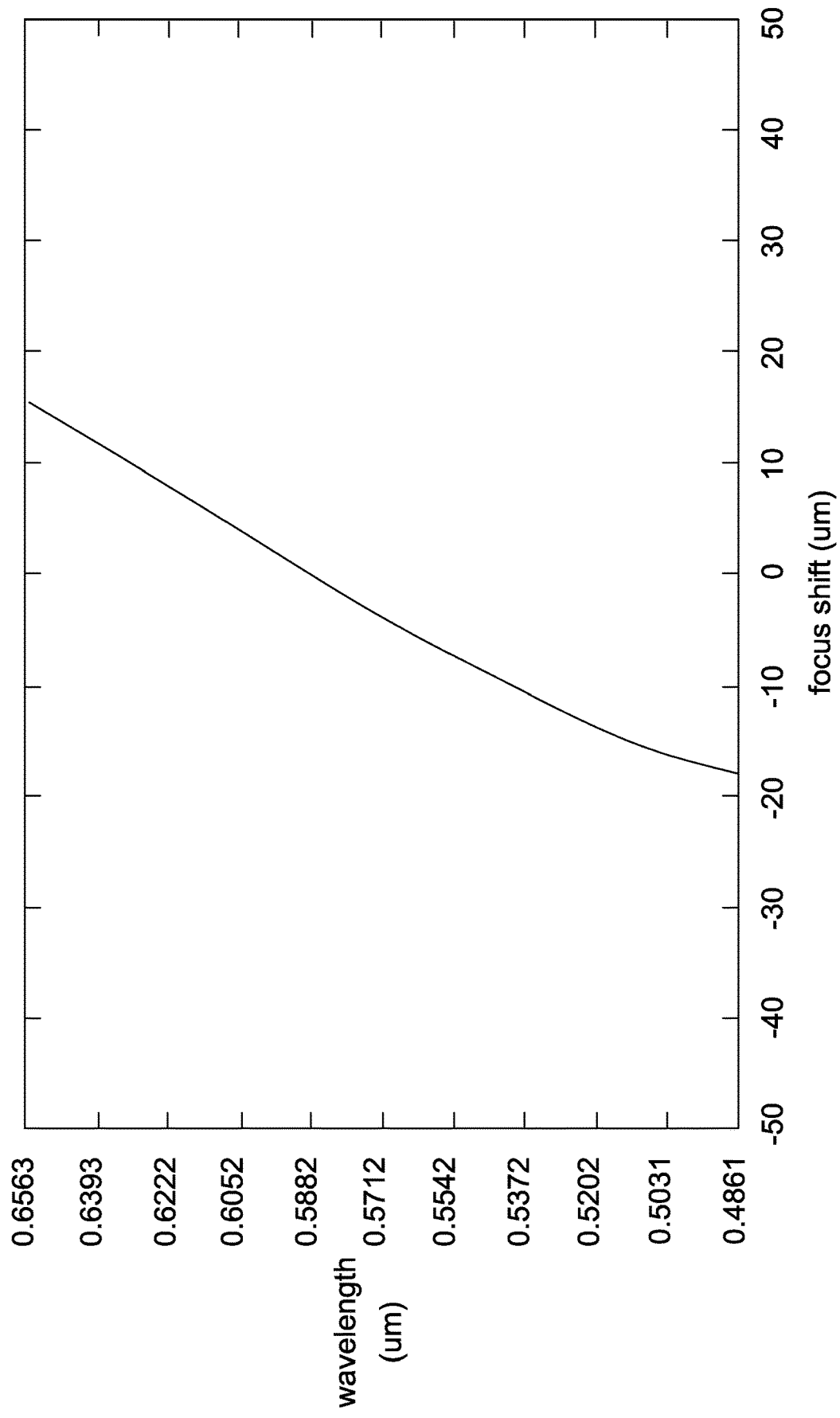
Figure 14:
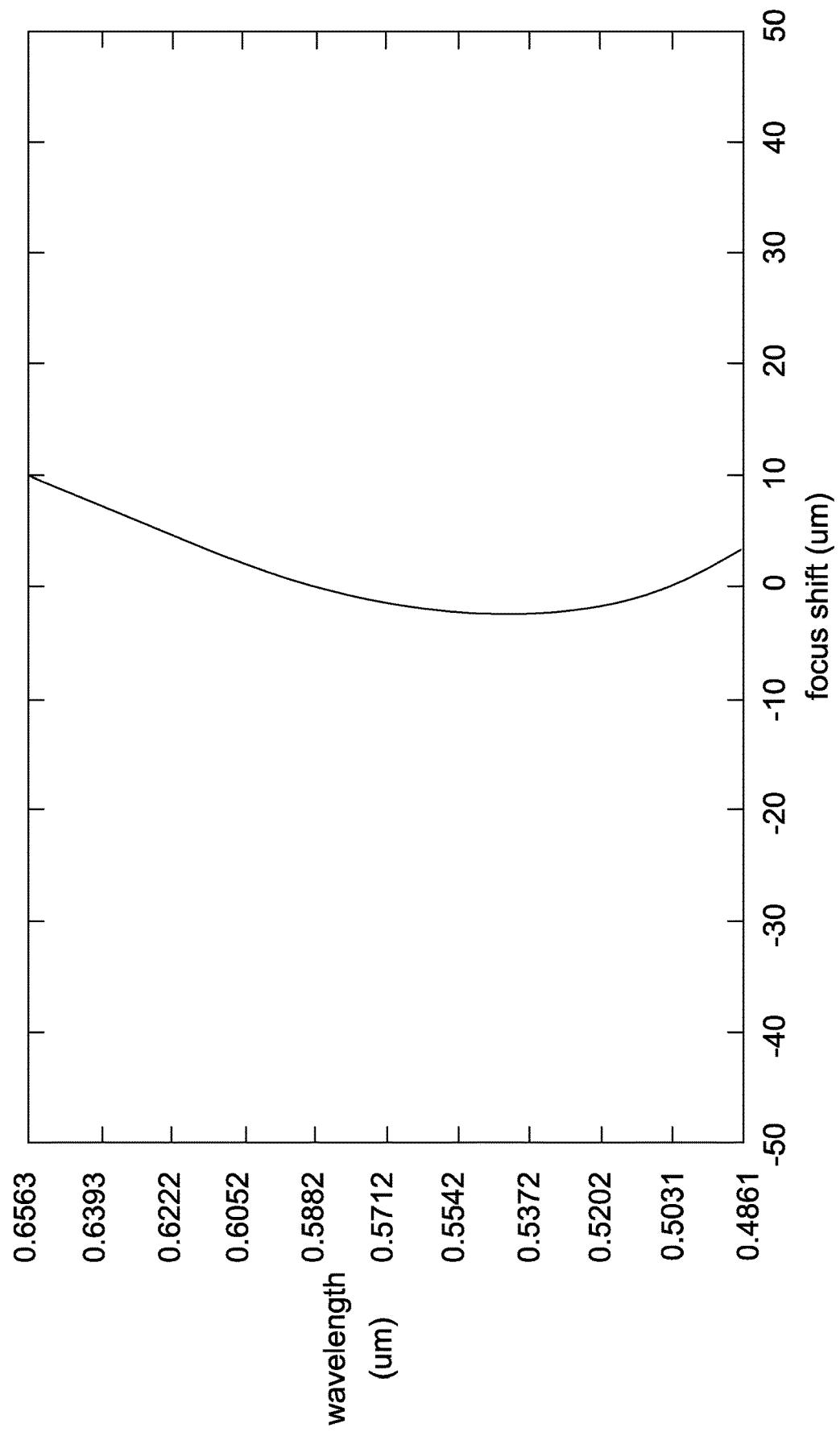
Figure 15:
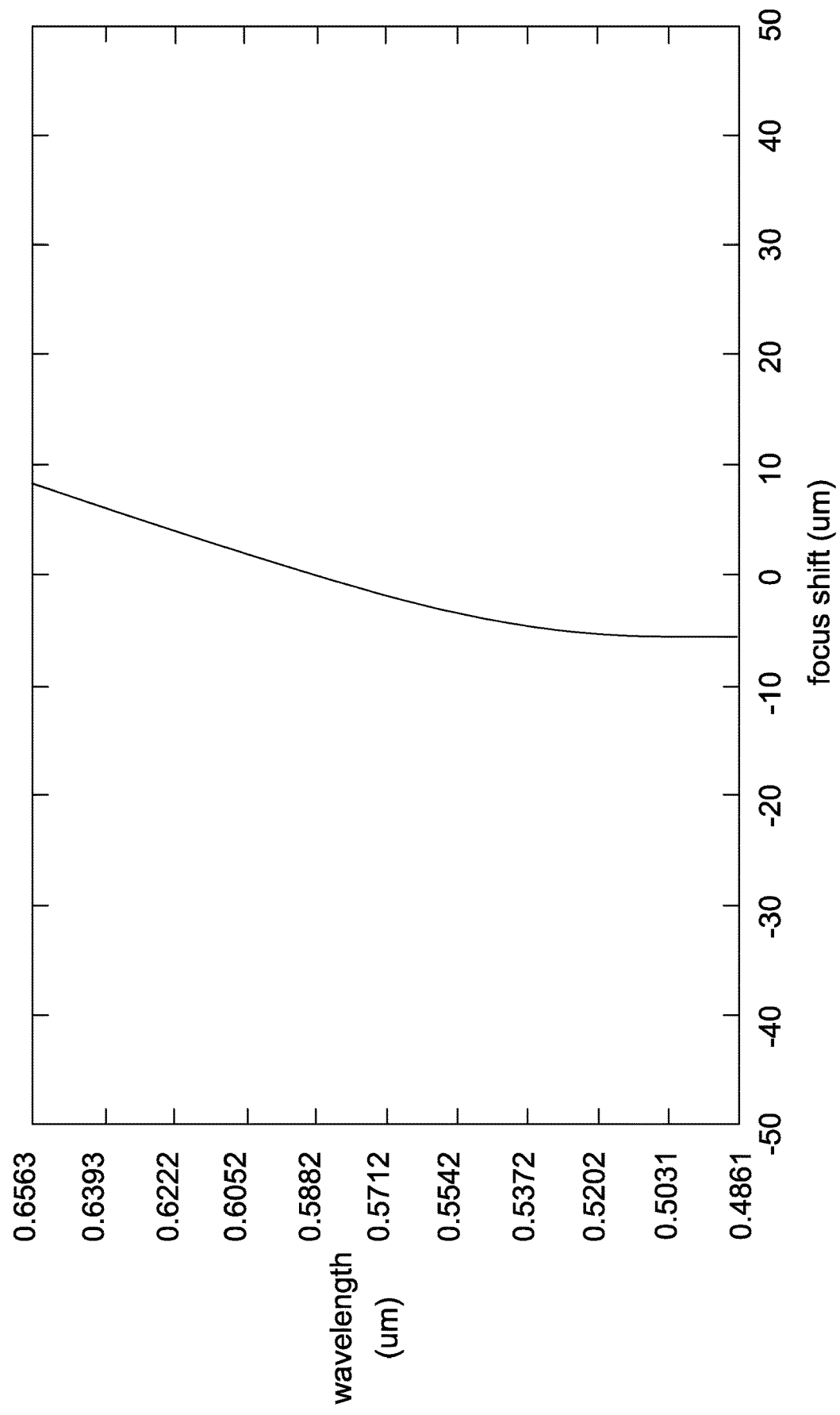

FIG. 6 and FIG. 11 illustrate optical simulation results of the optical lens 10a. FIG. 6 shows a ray fan plot for visible light of the optical lens 10a, where an abscissa of the plot represents entrance pupil positions, and an ordinate of the plot represents relative numerical values of positions on an image plane (such as the image plane S15) where main light beams are projected. FIG. 11 shows values of a focus shift for visible light measured at different wavelengths. As shown in FIG. 11, the values of the focus shift at different wavelengths are considerable small to prove that the optical lens 10a has good optical performance. The simulated results shown in FIG. 6 and FIG. 11 are within permitted ranges specified by the standard, which indicates the above embodiment of the optical lens 10a may achieve good imaging quality. In one embodiment, the optical lens may include two lens groups, and the front lens group may include two lenses (such as the first lens L1 and the second lens L2) with negative refractive powers to increase light collection efficiency and achieve a range of full field of view (FOV) of about 160 to about 180 degrees, but the invention is not limited thereto. An F-number of the optical lens is smaller than or equal to 1.9. Besides, the rear lens group may include a doublet lens or a triplet lens to reduce aberrations, and thus a minimum distance between two lenses of the rear lens group along an optical axis is smaller than 0.05 mm. In one embodiment, a total number of lenses with refractive powers in the optical lens is at least six and at most nine, an entrance pupil diameter of the optical lens is greater than 2 mm, and the optical lens has at least one lens with an Abbe number of greater than 60.

In one embodiment, the optical lens may satisfy a condition of 1.9<LD1/LD3<2.6, a further condition of 1.92<LD1/LD3<2.56, and a still further condition of 1.92<LD1/LD3<2.54, where LD1 is a diameter of a surface of the first lens L1 facing the magnified side OS (the first side), and LD3 is a diameter of a surface of the third lens L3 facing the minified side IS (the second side). The first lens L1 belongs to the first lens group and is closest to the magnified side among the first lens group. The third lens L3 belongs to the first lens group and is closest to the aperture stop 14 among the first lens group. Meeting the above conditions may facilitate light converging capability of lenses to thus allow for better optical performance in a limited space.

In one embodiment, the optical lens may satisfy a condition of LD1/LDL<1.55, a further condition of LD1/LDL<1.54, and a still further condition of LD1/LDL<1.53, where LD1 is a diameter of a surface of the first lens L1 facing the magnified side OS (the first side), and LDL is a diameter of a surface of the last lens (the seventh lens L7 in this embodiment) facing the minified side IS (the second side). The last lens belongs to the second lens group and is closest to the minified side IS and the image plane 18 among the second lens group. Meeting the above conditions may facilitate light converging capability of lenses to reduce the scope of image beams passing through lenses to match the size of a photosensor and thus allow for better optical performance in a limited space.

In one embodiment, the optical lens may satisfy a condition of LT/IMH<4.7, a further condition of LT/IMH<4.69, and a still further condition of LT/IMH<4.68, where IMH is semi-diagonal image height on an image plane that equals half of an image circle (a diagonal length of an image on the image plane), and LT is a distance along an optical axis between a surface of a first lens (the lens closest to the magnified side) facing the magnified side OS and a surface of a last lens (the lens closest to the minified side) facing the minified side IS. Note that this criterion allows for an optimized proportion of a photosensor to a total track length; that is, providing a proportionally longer LT when using a larger photosensor and a proportionally shorter LT when using a smaller photosensor.

Figure 2:
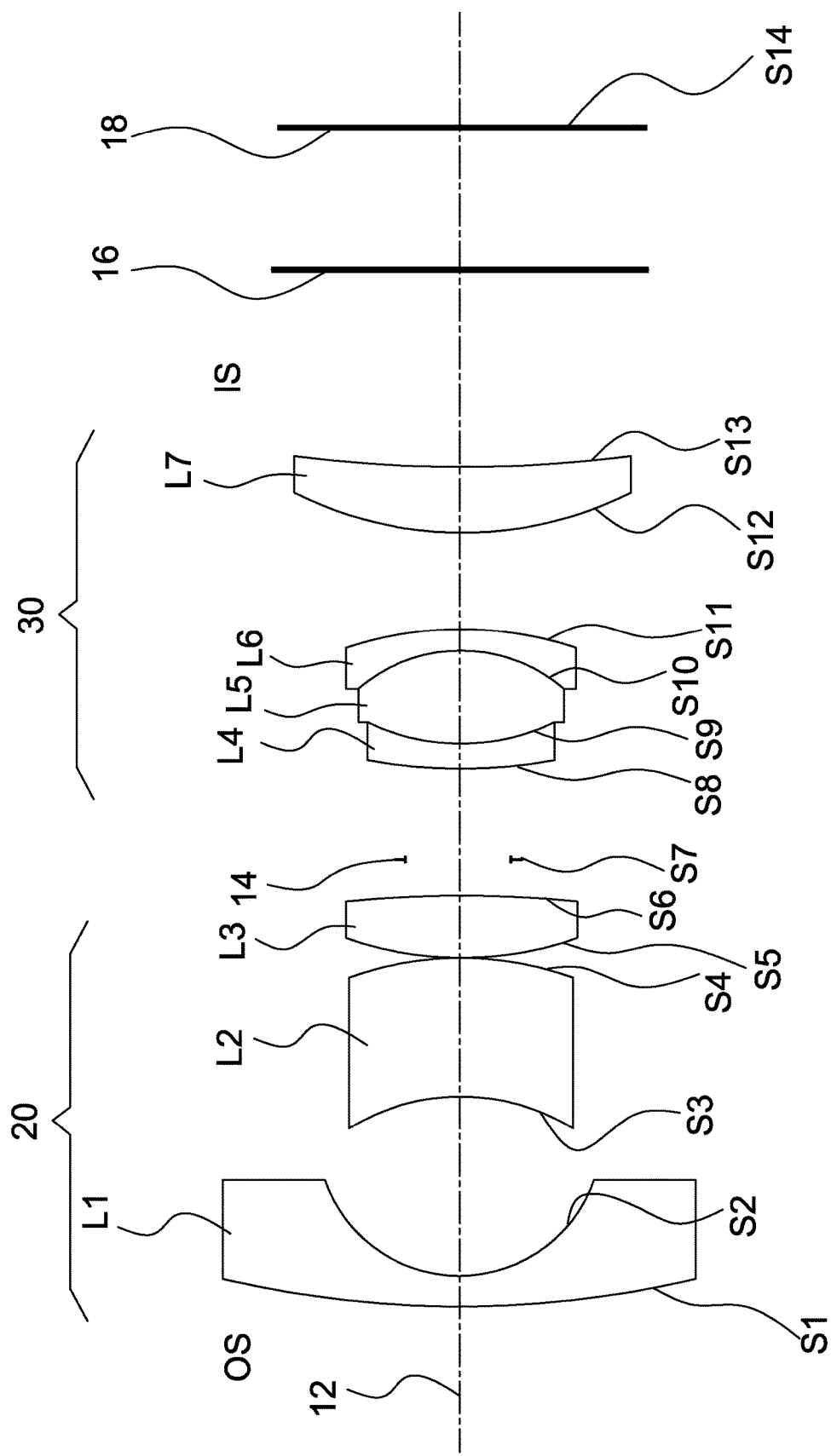
FIG. 2 shows a cross-sectional illustration of an optical lens according to another embodiment of the invention.

FIG. 2 shows a cross-sectional illustration of an optical lens 10b according to a second embodiment of the invention. In this embodiment, the refractive powers of the first lens L1 to the seventh lens L7 are negative, negative, positive, negative, positive, negative and positive, and all the lenses L1-L7 are spherical lenses. The fourth lens L4, the fifth lens L5 and the sixth lens L6 are fit together to form a triplet lens. Further, in this embodiment, the diameter of the surface S1 is 5.83 mm, the diameter of the surface S6 is 3 mm, and the diameter of the surface S13 is 4.3 mm. Detailed optical data and design parameters of the optical lens 10b are shown in Table 2 below.

TABLE 2

F/# = 1.8; LT = 25.8 (mm)
FOV = 160 degrees; LT/IMH = 4.668

| surface | radius of curvature (mm) | interval (mm) | refractive index | Abbe number | object description |
|---|---|---|---|---|---|
| S1 | 33.11 | 0.6 | 1.7 | 47 | L1(meniscus) |
| S2 | 3.75 | 4.6 | | | |
| S3 | −5.94 | 3.6 | 1.9 | 41 | L2(meniscus) |
| S4 | −8.04 | 0.1 | | | |
| S5* | 10.81 | 1.4 | 1.9 | 41 | L3(biconvex) |
| S6* | −41.61 | 1.0 | | | |
| S7 | INF | 2.4 | | | aperture stop |
| S8 | 16.66 | 0.6 | 1.7 | 29 | L4(meniscus) |
| S9 | 5.54 | 2.3 | 1.5 | 81 | L5(biconvex) |
| S10 | −4.06 | 0.6 | 1.8 | 26 | L6(meniscus) |

TABLE 2-continued

F/# = 1.8; LT = 25.8 (mm)
FOV = 160 degrees; LT/IMH = 4.668

| surface | radius of curvature (mm) | interval (mm) | refractive index | Abbe number | object description |
|---|---|---|---|---|---|
| S11 | −8.71 | 2.5 | | | |
| S12 | 9.34 | 1.8 | 1.6 | 63 | L7(meniscus) |
| S13 | 103.71 | 4.4 | | | |
| S14 | INF | | | | image plane |

Figure 3:
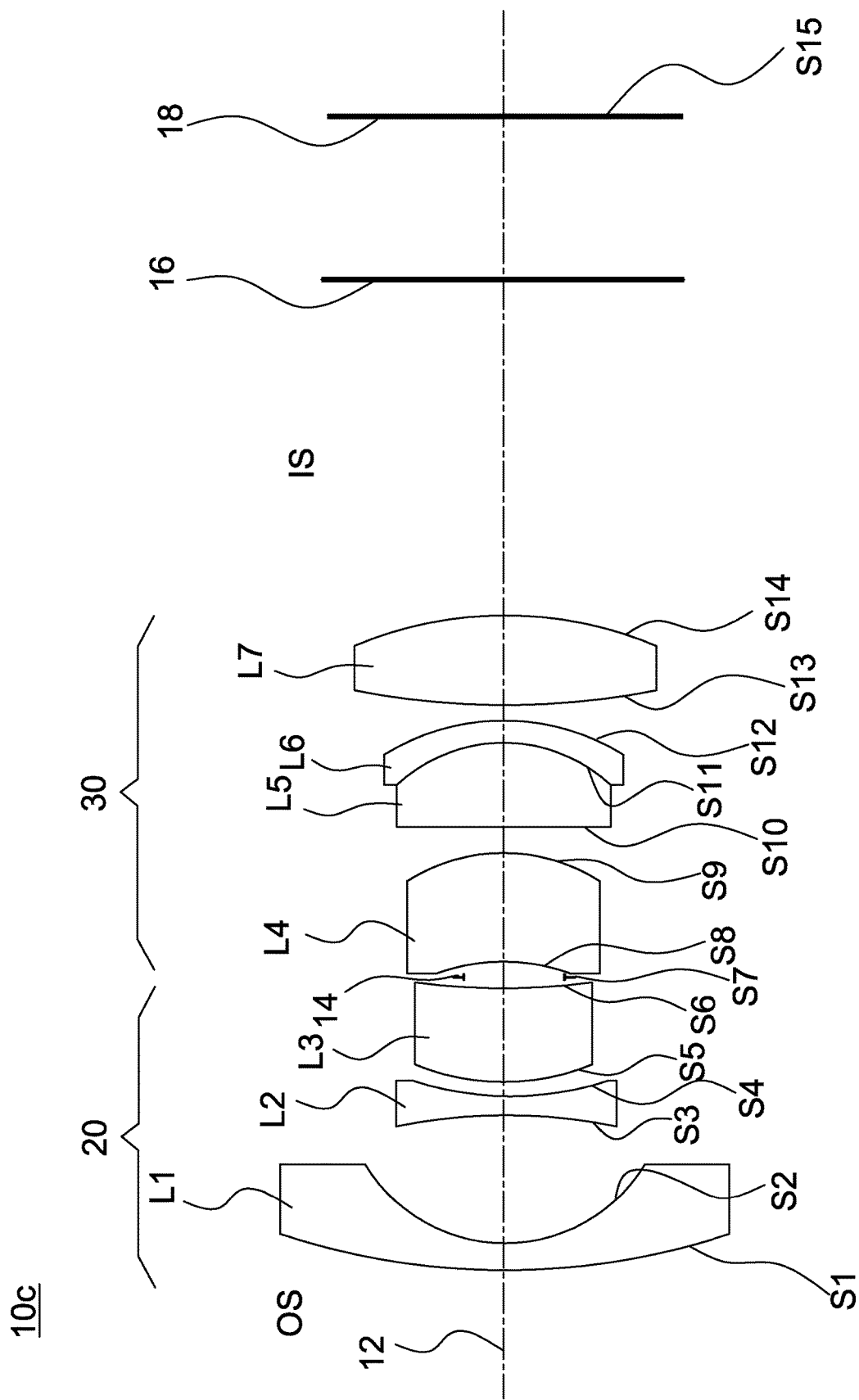
FIG. 3 shows a cross-sectional illustration of an optical lens according to another embodiment of the invention.

FIG. 3 shows a cross-sectional illustration of an optical lens 10c according to a third embodiment of the invention. In this embodiment, the refractive powers of the first lens L1 to the seventh lens L7 are negative, negative, positive, positive, positive, negative and positive, and the fourth lens L4 is an aspheric lens. The fifth lens L5 and the sixth lens L6 are fit together to form a doublet lens. Further, in this embodiment, the diameter of the surface S1 is 6.11 mm, the diameter of the surface S6 is 2.41 mm, and the diameter of the surface S14 is 4.15 mm. In this embodiment, the aspheric lens is made from glass molding. In other embodiment, the aspheric lens may be made from plastic. Detailed optical data and design parameters of the optical lens 10c are shown in Table 3 below.

TABLE 3

F/# = 1.8; LT = 25.74 (mm)
FOV = 160 degrees; LT/IMH = 4.628

| surface | radius of curvature (mm) | interval (mm) | refractive index | Abbe number | object description |
|---|---|---|---|---|---|
| S1 | 18.85 | 0.8 | 1.7 | 48 | L1(meniscus) |
| S2 | 4.47 | 3.5 | | | |
| S3 | −12.83 | 0.5 | 1.5 | 81 | L2(biconcave) |
| S4 | 5.64 | 0.4 | | | |
| S5 | 6.68 | 2.7 | 2 | 29 | L3(meniscus) |
| S6 | 39.86 | 0.1 | | | |
| S7 | INF | 0.4 | | | aperture stop |
| S8* | −6.82 | 3.0 | 1.7 | 55 | L4(aspherical) |
| S9* | −5.32 | 0.7 | | | |
| S10 | INF. | 2.5 | 1.5 | 81 | L5(plano-convex) |
| S11 | −3.93 | 0.5 | 2 | 19 | L6(meniscus) |
| S12 | −5.81 | 0.5 | | | |
| S13 | 26.38 | 2.3 | 1.5 | 81 | L7(biconvex) |
| S14 | −10.02 | 7.8 | | | |
| S15 | INF | 2.4 | | | image plane |

In the following design example, each aspheric surface satisfies the following equation:

$$Z = \frac{cr^2}{1 + \sqrt{1 - (1+k)c^2 r^2}} + \sum_{i=1}^{N} \alpha_i r^i,$$

where Z denotes a sag of an aspheric surface along the optical axis 12, c denotes a reciprocal of a radius of an osculating sphere, k denotes a Conic constant, r denotes a height of the aspheric surface, and $\alpha_i$ denotes aspheric coefficients of each order.

Table 4 lists aspheric coefficients and conic constants of aspheric surfaces S8 of the optical lens 10c.

TABLE 4

| surface | K | $\alpha_4$ | $\alpha_6$ | $\alpha_8$ |
|---|---|---|---|---|
| S8* | 0 | −2.79E−03 | −4.05E−05 | −9.92E−06 |
| S9* | 0 | −1.72E−04 | 1.54E−06 | −2.14E−06 |

Figure 4:
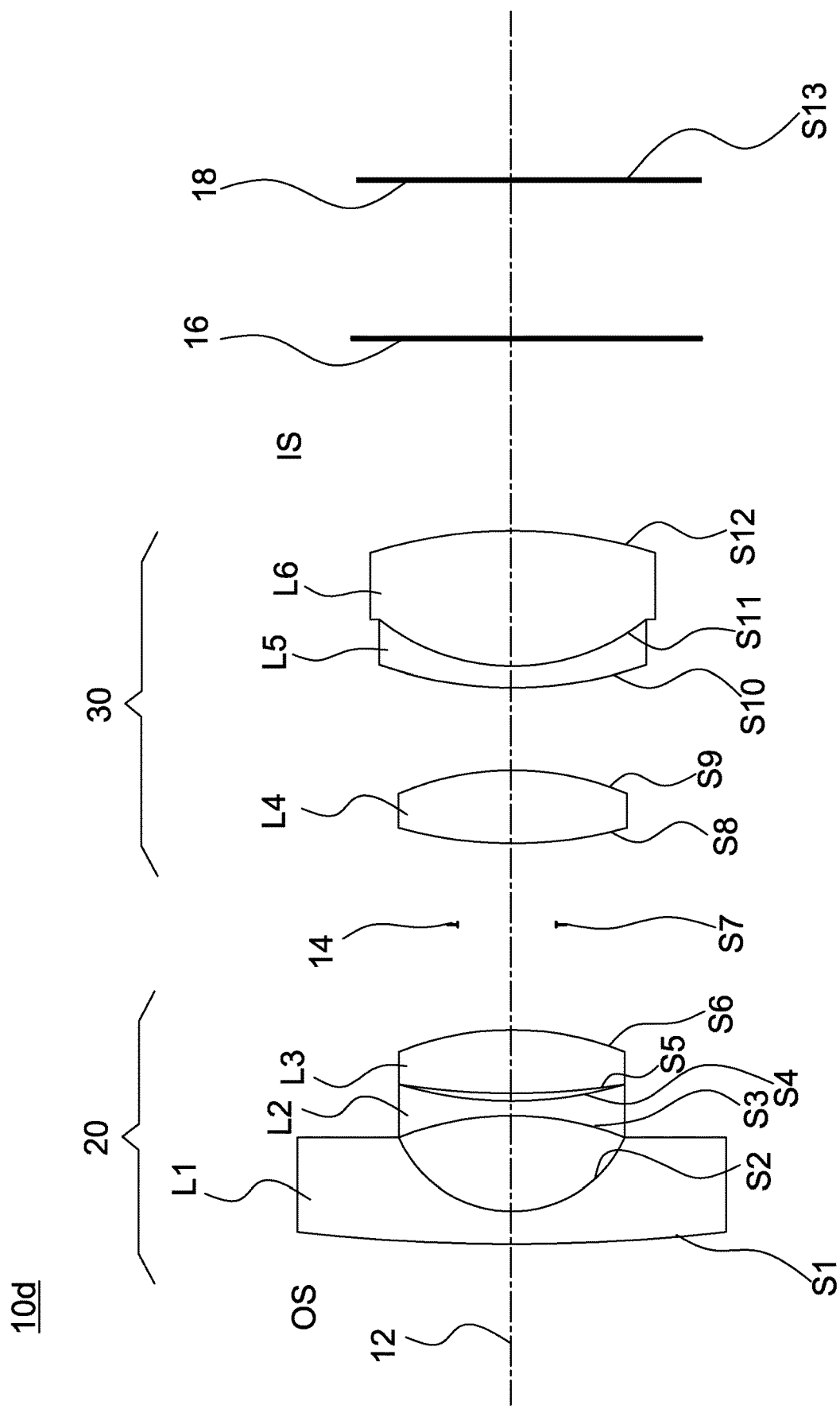
FIG. 4 shows a cross-sectional illustration of an optical lens according to another embodiment of the invention.

FIG. 4 shows a cross-sectional illustration of an optical lens 10d according to a fourth embodiment of the invention. In this embodiment, the refractive powers of the first lens L1 to the sixth lens L6 are negative, negative, positive, positive, negative and positive, and the fourth lens L4 is an aspheric lens. The fifth lens L5 and the sixth lens L6 are fit together to form a doublet lens. Further, in this embodiment, the diameter of the surface S1 is 6.04 mm, the diameter of the surface S6 is 3.14 mm, and the diameter of the surface S12 is 3.97 mm. Detailed optical data and design parameters of the optical lens 10d are shown in Table 5 below.

TABLE 5

F/# = 1.8; LT = 25.73 (mm)
FOV = 160.8 degrees; LT/IMH = 4.57

| surface | radius of curvature (mm) | interval (mm) | refractive index | Abbe number | object description |
|---|---|---|---|---|---|
| S1 | 59.27 | 0.8 | 1.5 | 70 | L1(meniscus) |
| S2 | 3.55 | 2.8 | | | |
| S3 | −9.53 | 0.5 | 1.9 | 19 | L2(biconcave) |
| S4 | 10.90 | 0.4 | | | |
| S5 | 31.82 | 1.5 | 2 | 19 | L3(biconvex) |
| S6 | −9.37 | 3.2 | | | |
| S7 | INF | 2.4 | | | aperture stop |
| S8* | 11.31 | 2.0 | 1.6 | 60 | L4(aspherical) |
| S9* | −6.75 | 2.5 | | | |
| S10 | 13.55 | 0.5 | 2 | 19 | L5(meniscus) |
| S11 | 5.67 | 3.8 | 1.5 | 81 | L6(biconvex) |
| S12 | −11.33 | 5.5 | | | |
| S13 | INF | | | | image plane |

Table 6 lists aspheric coefficients and conic constants of aspheric surfaces of the optical lens 10d.

TABLE 6

| surface | K | $\alpha_4$ |
|---|---|---|
| S8* | 0 | −2.41E−03 |
| S9* | 0 | −1.89E−03 |

Figure 5:
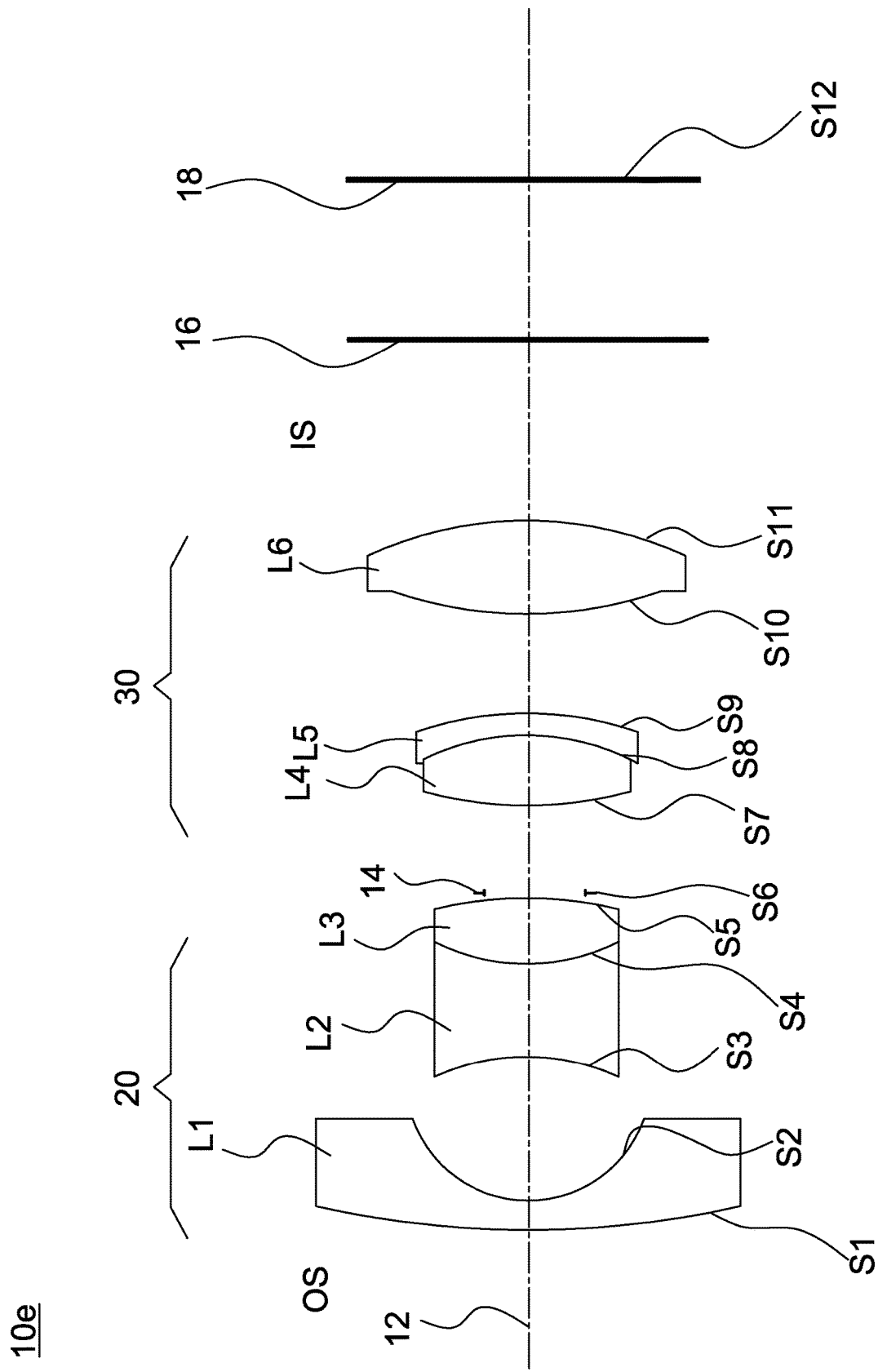
FIG. 5 shows a cross-sectional illustration of an optical lens according to another embodiment of the invention.

FIG. 5 shows a cross-sectional illustration of an optical lens 10e according to a fifth embodiment of the invention. In this embodiment, the refractive powers of the first lens L1 to the sixth lens L6 are negative, negative, positive, positive, negative and positive. The second lens L2 and the third lens L3 are fit together to form a doublet lens, and the fourth lens L4 and the fifth lens L5 are fit together to form another doublet lens. Further, in this embodiment, the diameter of the surface S1 is 6.10 mm, the diameter of the surface S5 is 2.63 mm, and the diameter of the surface S11 is 4.6 mm. Detailed optical data and design parameters of the optical lens 10e are shown in Table 7 below.

TABLE 7

F/# = 1.8; LT = 25.74 (mm)
FOV = 160 degrees; LT/IMH = 4.57

| surface | radius of curvature (mm) | interval (mm) | refractive index | Abbe number | object description |
|---|---|---|---|---|---|
| S1 | 38.13 | 0.8 | 1.50 | 69.00 | L1(meniscus) |
| S2 | 3.36 | 4.0 | | | |
| S3 | −7.32 | 3.0 | 1.65 | 31.00 | L2(biconcave) |
| S4 | 6.97 | 1.7 | 2.00 | 28.00 | L3(biconvex) |
| S5 | −13.04 | 0.1 | | | |
| S6 | INF | 2.7 | | | aperture stop |
| S7 | 8.26 | 2.1 | 1.50 | 76.00 | L4(biconvex) |
| S8 | −5.71 | 0.5 | 2.00 | 19.00 | L5(meniscus) |
| S9 | −13.02 | 3.0 | | | |
| S10* | 8.40 | 2.7 | 1.50 | 81.00 | L6(aspherical) |
| S11* | −8.32 | 5.3 | | | |
| S12 | INF | | | | image plane |

Table 8 lists aspheric coefficients and conic constants of aspheric surfaces of the optical lens 10e.

TABLE 8

| surface | K | $\alpha_4$ | $\alpha_6$ | $\alpha_8$ |
|---|---|---|---|---|
| S10* | 0 | −1.20E−03 | −5.48E−07 | −1.42E−06 |
| S11* | 0 | −4.36E−04 | −1.09E−05 | −7.18E−07 |

FIGS. 7-10 and FIGS. 12-15 illustrate optical simulation results of the optical lenses 10b, 10c, 10d and 10e. FIGS. 7-10 show ray fan plots for visible light, where an abscissa of the plot represents entrance pupil positions, and an ordinate of the plot represents relative numerical values of positions on an image plane where main light beams are projected. FIGS. 12-15 show values of a focus shift for visible light measured at different wavelengths. As shown in FIGS. 12-15, the values of the focus shift at different wavelengths are considerable small to prove that the optical lens 10b, 10c, 10d and 10e have good optical performance. The simulated results shown in the above figures are within permitted ranges specified by the standard, which indicates the above embodiment of the optical lens 10b, 10c, 10d and 10e may achieve good imaging quality.

In one embodiment, a fabrication method for the optical lens 10a-10e may include the steps of providing a lens barrel, placing and fixing a first lens group 20 inside the lens barrel, and placing and fixing a second lens group 30 inside the lens barrel. The order of the above steps are not restricted and may vary according to actual demands.

According to the above embodiments, an optical lens having lighter weight, lower fabrication costs and good imaging quality is provided.

Though the embodiments of the invention and design parameters in the tables have been presented for purposes of illustration and description, they are not intended to be exhaustive or to limit the invention. Accordingly, many modifications and variations without departing from the spirit of the invention or essential characteristics thereof will be apparent to practitioners skilled in this art. For example, the number of all lenses of each lens group or optical parameters such as refractive power for each lens may be changed, or a lens without affecting the overall optical performance may be additionally provided. It is intended that the scope of the invention be defined by the claims appended hereto and their equivalents in which all terms are meant in their broadest reasonable sense unless otherwise indicated.

What is claimed is:

1. An optical lens, comprising:
   a first lens group and a second lens group arranged in order from a first side to a second side;
   an aperture stop disposed between the first lens group and the second lens group, the optical lens having at least six lenses and at most nine lenses with refractive powers, a full field of view of 160 degrees to 180 degrees, and an entrance pupil diameter of greater than 2 mm, and the optical lens satisfying the condition:
   LT/IMH<4.7, where IMH is semi-diagonal image height on an image plane that equals half of an image circle, LT is a distance along an optical axis between a surface of a first lens of the first lens group facing the first side and a surface of a last lens of the second lens group facing the second side, the first lens is closest to the first side among the first lens group, and the last lens is closest to the second side among the second lens group.

2. The optical lens as claimed in claim 1, wherein a surface of a second lens facing the second side is a concave surface, with the second lens being designated in order from the first side.

3. The optical lens as claimed in claim 1, wherein the second lens group has an aspheric lens.

4. The optical lens as claimed in claim 1, wherein the second lens group has a triplet lens.

5. The optical lens as claimed in claim 1, wherein the first lens group comprises three lenses with refractive powers, and the second lens group comprises at least three and at most four lenses with refractive powers.

6. The optical lens as claimed in claim 1, wherein the second lens group comprises at least one doublet lens.

7. The optical lens as claimed in claim 1, wherein a minimum distance between two lenses of the second lens group along an optical axis is smaller than 0.05 mm.

8. The optical lens as claimed in claim 1, wherein the second lens group has at least one lens with an Abbe number of greater than 60.

9. The optical lens as claimed in claim 1, wherein the optical lens satisfies one of the following conditions:
   (1) the optical lens comprises seven lenses having respective refractive powers of negative, negative, positive, positive, positive, negative and positive;
   (2) the optical lens comprises seven lenses having respective refractive powers of negative, negative, positive, negative, positive, negative and positive;
   (3) the optical lens comprises six lenses having respective refractive powers of negative, negative, positive, positive, negative and positive.

10. The optical lens as claimed in claim 1, wherein the optical lens satisfies one of the following conditions:
    (1) the optical lens comprises seven lenses having respective shapes of meniscus, biconcave, biconvex, meniscus, biconvex, meniscus and biconvex;
    (2) the optical lens comprises seven lenses having respective shapes of meniscus, meniscus, biconvex, meniscus, biconvex, meniscus and meniscus;
    (3) the optical lens comprises seven lenses having respective shapes of meniscus, biconcave, meniscus, aspherical, plano-convex, meniscus and biconvex;
    (4) the optical lens comprises six lenses having respective shapes of meniscus, biconcave, biconvex, aspherical, meniscus and biconvex;
    (5) the optical lens comprises six lenses having respective shapes of meniscus, biconcave, biconvex, biconvex, meniscus and aspherical.

11. The optical lens as claimed in claim 1, wherein an F-number of the optical lens is smaller than or equal to 1.9.

12. An optical lens, comprising:
    a first lens group, an aperture stop and a second lens group arranged in order from a magnified side to a minified side, the first lens group having a negative refractive power, the second lens group having a positive refractive power, the optical lens having at least six lenses and at most nine lenses with refractive powers, and the optical lens satisfying the conditions:
    1.9<LD1/LD3<2.6 and LD1/LDL<1.55, where LD1 is a diameter of a surface of a first lens of the first lens group facing the magnified side, LD3 is a diameter of a surface of another lens of the first lens group facing the minified side, LDL is a diameter of a surface of a last lens of the second lens group facing the minified side, the first lens is closest to the magnified side among the first lens group, the another lens is closest to the aperture stop among the first lens group, and the last lens is closest to the minified side among the second lens group.

13. The optical lens as claimed in claim 12, wherein the optical lens satisfies one of the following conditions:
    (1) a surface of a second lens facing the minified side is a concave surface, with the second lens being designated in order from the magnified side;
    (2) the second lens group has an aspheric lens;
    (3) the second lens group has a triplet lens.

14. The optical lens as claimed in claim 12, wherein the first lens group comprises three lenses with refractive powers, and the second lens group comprises at least three and at most four lenses with refractive powers.

15. The optical lens as claimed in claim 12, wherein the second lens group comprises at least one doublet lens.

16. The optical lens as claimed in claim 12, wherein a minimum distance between two lenses of the second lens group along an optical axis is smaller than 0.05 mm.

17. The optical lens as claimed in claim 12, wherein the second lens group has at least one lens with an Abbe number of greater than 60.

18. The optical lens as claimed in claim 12, wherein the optical lens satisfies one of the following conditions:
    (1) the optical lens comprises seven lenses having respective refractive powers of negative, negative, positive, positive, positive, negative and positive;
    (2) the optical lens comprises seven lenses having respective refractive powers of negative, negative, positive, negative, positive, negative and positive;
    (3) the optical lens comprises six lenses having respective refractive powers of negative, negative, positive, positive, negative and positive.

19. The optical lens as claimed in claim 12, wherein the optical lens satisfies one of the following conditions:
    (1) the optical lens comprises seven lenses having respective shapes of meniscus, biconcave, biconvex, meniscus, biconvex, meniscus and biconvex;
    (2) the optical lens comprises seven lenses having respective shapes of meniscus, meniscus, biconvex, meniscus, biconvex, meniscus and meniscus;
    (3) the optical lens comprises seven lenses having respective shapes of meniscus, biconcave, meniscus, aspherical, plano-convex, meniscus and biconvex;
    (4) the optical lens comprises six lenses having respective shapes of meniscus, biconcave, biconvex, aspherical, meniscus and biconvex;

(5) the optical lens comprises six lenses having respective shapes of meniscus, biconcave, biconvex, biconvex, meniscus and aspherical.

20. The optical lens as claimed in claim 12, wherein an F-number of the optical lens is smaller than or equal to 1.9.

* * * * *